United States Patent
Lei et al.

(10) Patent No.: US 11,029,163 B2
(45) Date of Patent: Jun. 8, 2021

(54) METHOD AND APPARATUS FOR IDENTIFYING AND RECOMMENDING VEHICLE LOCATIONS TO FACILITATE DATA TRANSFER

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 348 days.

(21) Appl. No.: 16/160,638

(22) Filed: Oct. 15, 2018

(65) Prior Publication Data
US 2020/0116505 A1    Apr. 16, 2020

(51) Int. Cl.
| | |
|---|---|
| G01C 21/34 | (2006.01) |
| G08G 1/14 | (2006.01) |
| G06F 8/65 | (2018.01) |
| H04W 4/40 | (2018.01) |
| H04W 4/02 | (2018.01) |

(52) U.S. Cl.
CPC .......... *G01C 21/3407* (2013.01); *G06F 8/65* (2013.01); *G08G 1/14* (2013.01); *H04W 4/023* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 9,046,370 B2 | 6/2015 | Annapureddy et al. | |
| 2001/0034761 A1* | 10/2001 | Matsui | H04L 12/2856 709/203 |
| 2002/0014976 A1* | 2/2002 | Yoshida | G08G 1/094 340/928 |
| 2009/0135845 A1* | 5/2009 | Husain | H04M 3/5183 370/420 |
| 2017/0234694 A1* | 8/2017 | Flores | G08G 1/143 701/428 |
| 2018/0007161 A1 | 1/2018 | Hwang et al. | |
| 2018/0063285 A1* | 3/2018 | Nordbruch | H04L 67/34 |
| 2018/0084587 A1* | 3/2018 | Noor | H04W 76/50 |
| 2018/0211534 A1* | 7/2018 | de Moura | H04W 4/40 |
| 2018/0270831 A1* | 9/2018 | Meredith | H04W 4/027 |
| 2018/0313661 A1* | 11/2018 | Eyster | G01C 21/3617 |
| 2018/0336784 A1* | 11/2018 | Liu | G08G 1/096866 |
| 2019/0187976 A1* | 6/2019 | Lee | H04L 67/34 |
| 2019/0377202 A1* | 12/2019 | Hoheisel | H04B 10/11 |

* cited by examiner

*Primary Examiner* — Krishnan Ramesh
(74) *Attorney, Agent, or Firm* — Michael Spenner; Brooks Kushman P.C.

(57) ABSTRACT

A system includes a processor configured to determine that a high-speed data transfer is desired for a vehicle. The processor is also configured to identify parking, within a predefined distance from a destination location, which overlaps with identified areas of high-speed coverage meeting a predefined speed and display visual indicators of the identified parking, when a vehicle is within a predefined distance from the identified parking.

8 Claims, 4 Drawing Sheets

METHOD AND APPARATUS FOR IDENTIFYING AND RECOMMENDING VEHICLE LOCATIONS TO FACILITATE DATA TRANSFER

TECHNICAL FIELD

The illustrative embodiments generally relate to methods and apparatuses for identifying and recommending vehicle locations to facilitate data transfer.

BACKGROUND

As vehicles include more and more onboard hardware, firmware and software in various electronic control units (ECUs) and other onboard data repositories, there is an increasing desire to keep all of the updateable parts of this complex system updated. Because there may be a multitude of interactions with a large update, many updates require further update of a number of subsystems, which may vary from a vehicle to vehicle basis.

Requiring a user to manually manage all of the various updates can become cumbersome, but having the user drive a vehicle to a dealership to receive an update can alternatively be a nuisance to the users, especially if multiple updates per month would be preferred by the OEM. In response, original equipment manufacturers (OEMs) have attempted to use wireless data-transfer to update vehicle data. While this may be an effective technique in terms of removing the user from the equation, the overall volume of data needed when one considers a manufacturer fleet of millions of vehicles may make this a cost/time prohibitive solution.

Software updates also are often too large to be completely transferred during a single key cycle or key-off cycle. Since much of the data may affect the vehicle's actual drivability, there is an incentive to facilitate transfer at certain times, such as when a user is within range of a home Wi-Fi network. Even so, much of the data transfer may be intended to be performed through non-Wi-Fi connections, and in those instances it would be easier for an OEM if more complete data could be transferred when a data transfer is desired.

SUMMARY

In a first illustrative embodiment, a system includes a processor configured to determine that a high-speed data transfer is desired for a vehicle. The processor is also configured to identify parking, within a predefined distance from a destination location, which overlaps with identified areas of high-speed coverage meeting a predefined speed and display visual indicators of the identified parking, when a vehicle is within a predefined distance from the identified parking.

In a second illustrative embodiment, a system includes a processor configured to determine that a high-speed data transfer is desired for a vehicle. The processor is also configured to determine regions, within a predefined distance from a current route, which overlap with areas of high-speed coverage meeting a predefined speed. Further, the processor is configured to display visual indicators of the regions, responsive to the vehicle being within a predefined distance from the determined regions, while traveling the current route.

In a third illustrative embodiment, a system includes a processor configured to determine that a vehicle has entered a parking area. The processor is also configured to determine a region of high-speed coverage meeting a predefined speed within the parking area. The processor is additionally configured to display visual indicators of the determined known region and, responsive to a user request, provide localized guidance within the parking area to parking within the known region.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
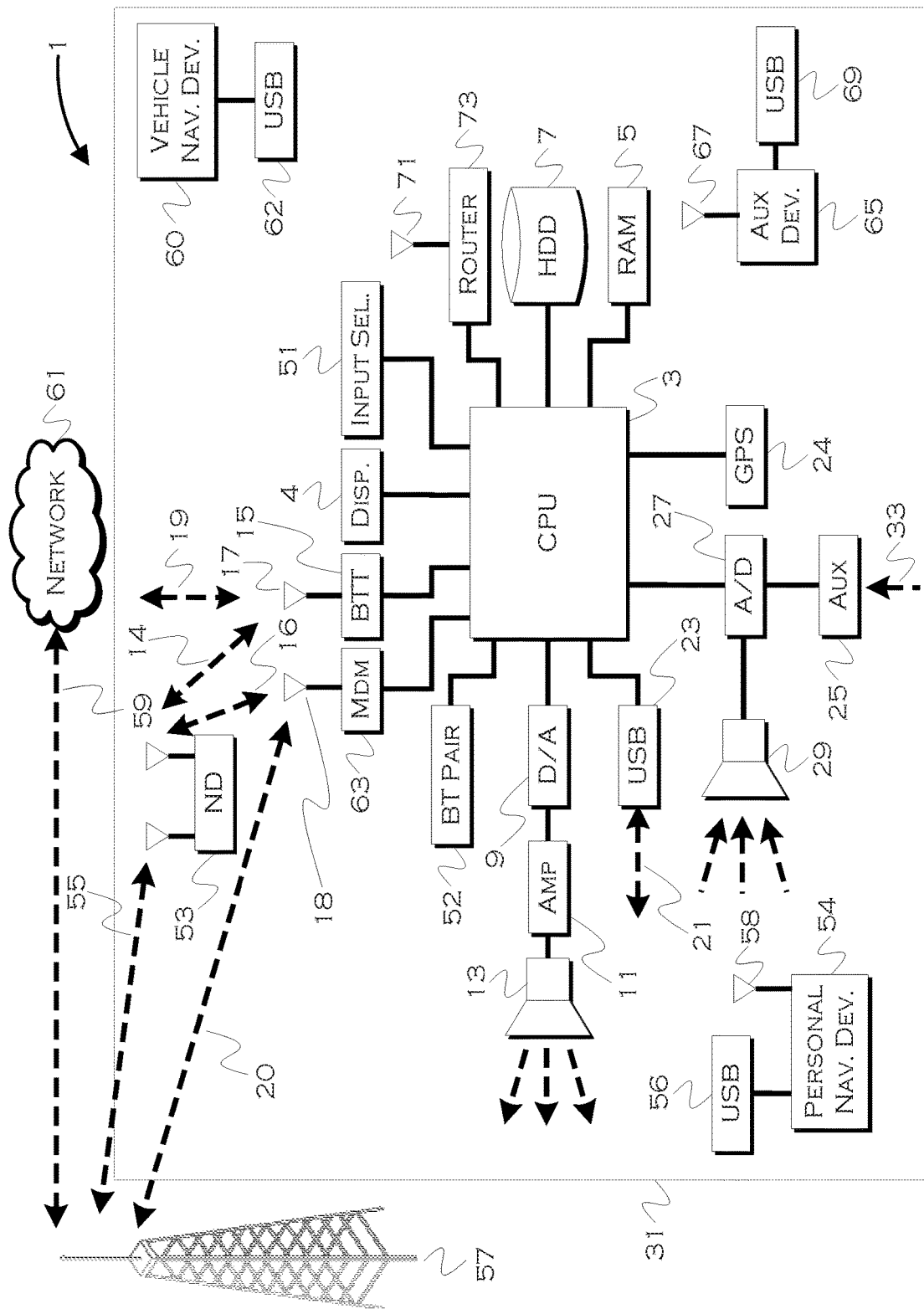
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

By providing guidance to parking locations where a known or projected high-speed transfer can occur, the illustrative concepts and embodiments provide opportunities to improve the utility and functionality of over-the air-updates. These solutions and the like allow users to complete updates while away from known network locations (known to the user) and increases opportunity for such updates to complete while a vehicle is parked. The novel, uncommon and atypical examples and concepts described herein demonstrate potential improvements achievable through use of those examples, concepts, and the like.

With the onset of 5G technology, high speed data transfer will often be available in select areas, but the range of such transfer (from a tower) may be significantly more limited than traditional coverage. That is, to take advantage of the 5G speeds for data transfer, a user may need to be within a certain proximity to a cellular tower or service point.

While the concept of coverage may be defined radially, in general, air conditions, buildings, environmental features and other obstacles may present interference, which can significantly impact range in a given vector. As such, it may be insufficient to simply guess as to whether a vehicle is within a known range of a town (known to meet 5G transmission speeds). That prediction may also be provided, as an initial suggestion, but the illustrative embodiments also provide improvements for more refined prediction about where higher network speeds will be available.

By determining areas of higher coverage, by guiding users in need of updates to those areas, and by refining the predictions based on observed transfers, the illustrative embodiments can provide guidance to specific parking areas known or predicted to provide improved data transfer. This can be highly useful if the user is planning on parking a vehicle long enough to complete a high-speed transfer of a file of a certain size, but not long enough to complete the transfer over a lower-speed connection.

Even more generally, allowing users to transfer the data faster will keep more vehicles updated more frequently, which can be of great assistance if trying to maintain updates on a fleet of any significant size, as well of being of use to the individual users.

By knowing, predicting and mapping areas of increased data transfer, the illustrative embodiments can provide areas along a route and at a destination where higher speed transfer can occur. By displaying and guiding users to those areas, the illustrative embodiments can assist vehicles in need of update to areas where the update is more likely to be completed.

Figure 2:
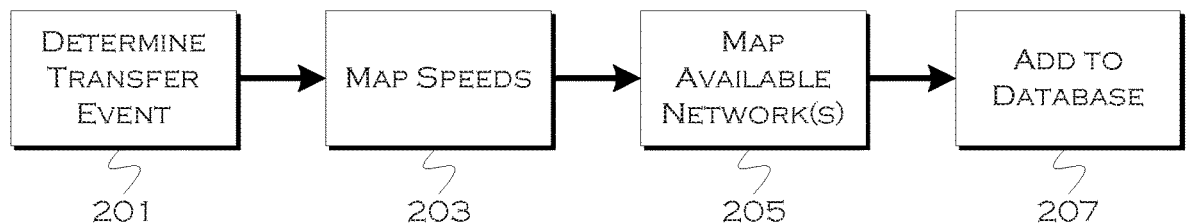
FIG. 2 shows an illustrative process for tracking network speeds.

FIG. 2 shows an illustrative process for tracking network speeds. This is an example of how feedback can be used to refine predictions about areas of high transfer. When a new tower is installed or enabled with a higher speed, but lower range, network, for example, some initial predictions about where which network speeds will be available, may be made.

An illustrative process such as that shown may be used to refine these predictions, map the coverage more fully, and also predict coverage for variables, such as weather, over time. In this example, the process may detect that a vehicle has parked in a particular location. The process can designate that location (to the extent not already known), as a parking location. If the process also detects 201 data transfer, the process can keep a record 203 of transfer speeds during the transfer. Connection types and available networks can also be mapped 205, to build a network profile for that location and/or under certain conditions. The process may then add 207 this information to a database of parking space data transfer characteristics.

In a more detailed example, the process may predict that a 5G network signal is derived from a tower of a certain location. Based on some predictive modeling, the process may generally indicate the signal as likely being available (at least above ground) in a linear path from the vehicle to the tower. Over time, other obstructions along this path may reveal areas of lost coverage, but this sort of determination can allow outlying points on the edge of coverage to define a predicted area of coverage without having to map every location radiating out from the central point.

As the process maps inter-lying areas and directs vehicles to areas of predicted coverage, better optics on the coverage can be obtained, and eventually a reasonable map of known coverage, and/or known coverage under known conditions, can be obtained. This map can then form the basis for improved recommendations, while self-updating based on experienced conditions as vehicles travel to instructed parking spaces. A similar concept can be used to direct autonomous vehicles to high-speed data locations if those vehicles need an update, and in that model it may be important to receive high speed updates because the vehicle will be out of service during the update. Instead of having the vehicle return to a home point for update, the process may find suitable regions of fast update out on the road-system, and be able to direct a vehicle to a point where it can receive an update at a fast speed, improving overall service availability.

Figure 3:
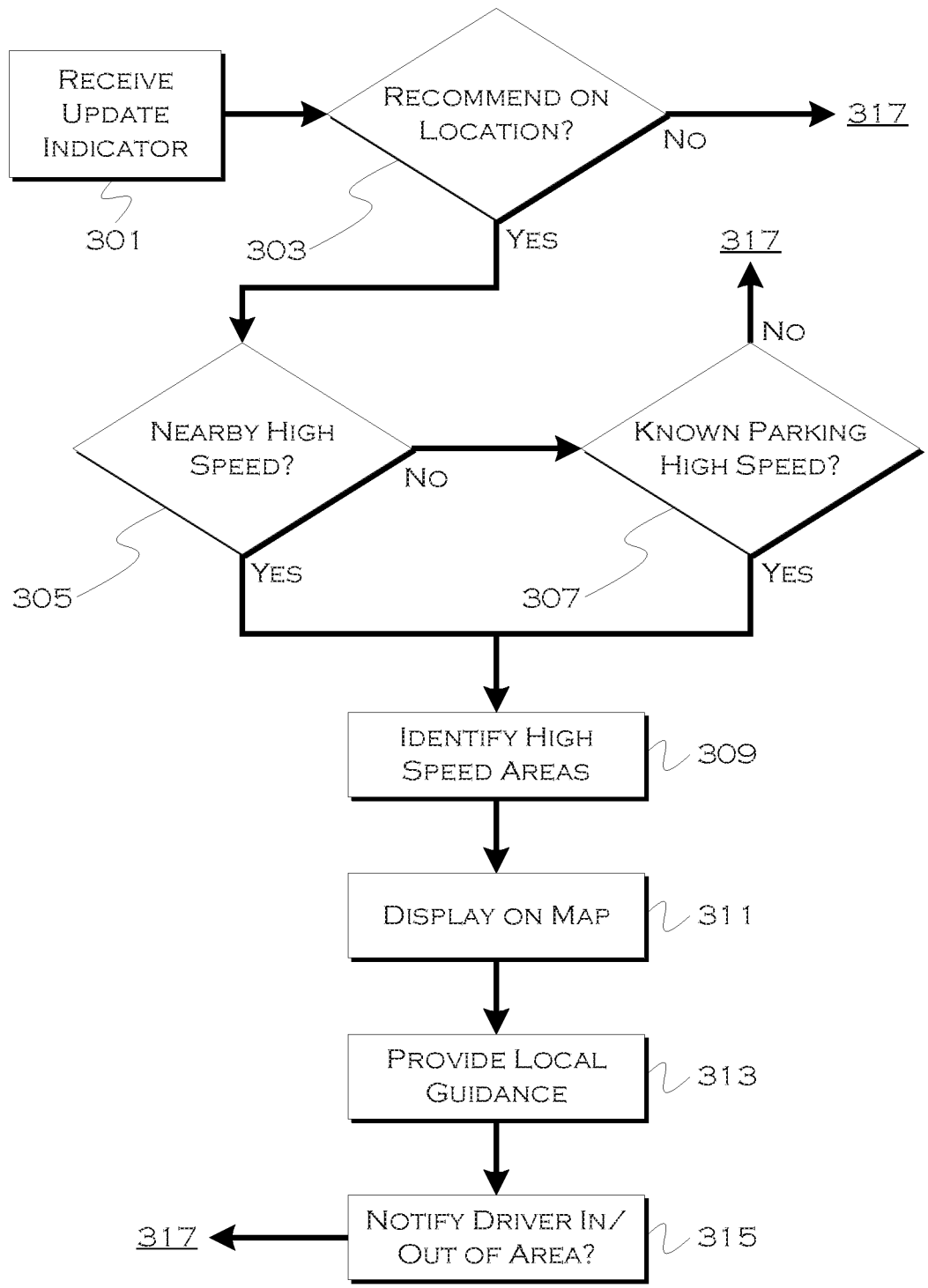
FIG. 3 shows an illustrative process for providing transfer location recommendations.
Figure 3:
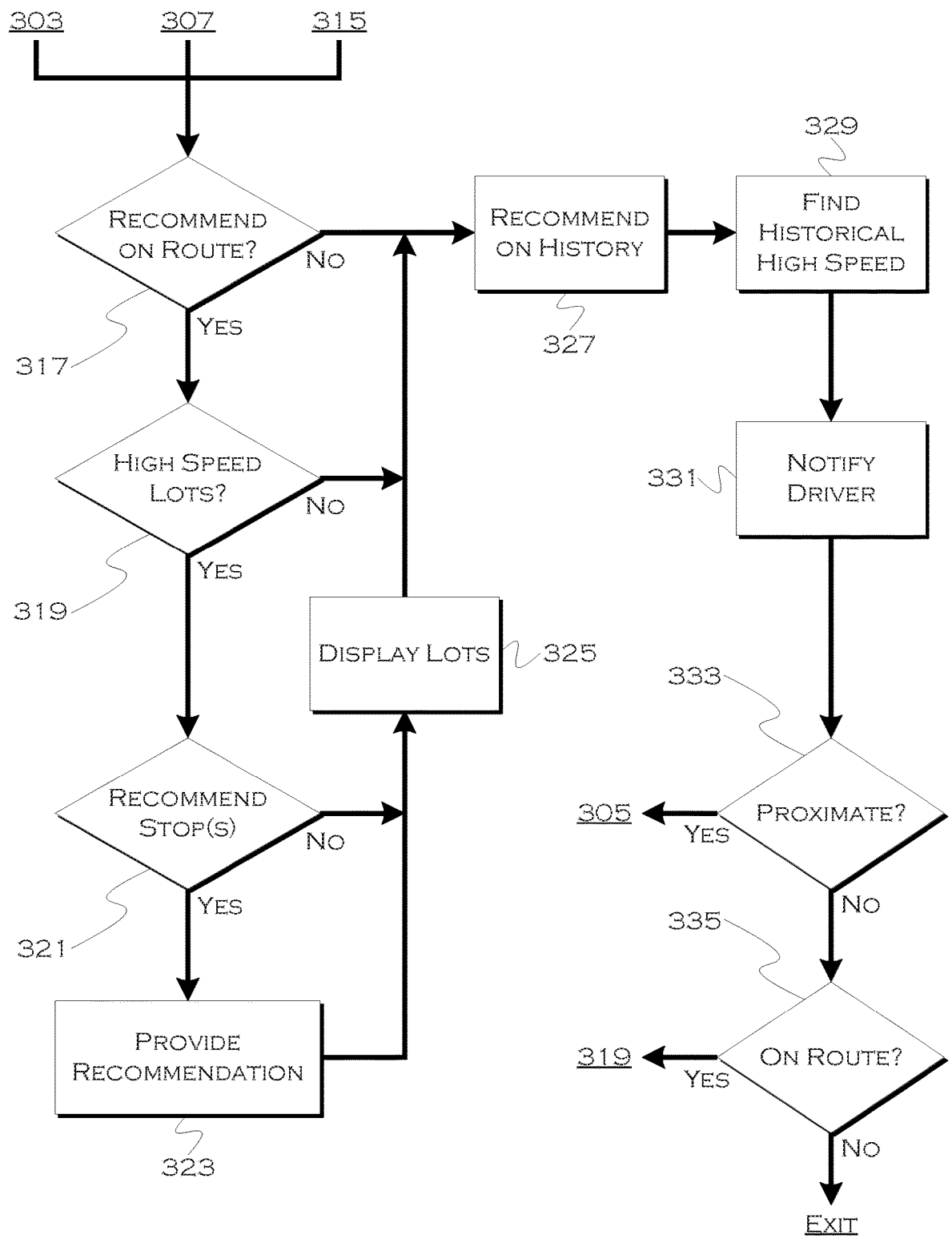

FIG. 3 shows an illustrative process for providing transfer location recommendations. In this example, the process will determine one or more suitable types of recommendations after receiving an indication that data (e.g., an update) is scheduled for download. This process can be used for any sizable data transfers and does not have to be exclusively applied to vehicle updates.

In this example, the process receives 301 an indicator that an update or other data is pending or desired. This indicator may include a data size, a projected transfer time at different rates, a preferred transfer connection, a criticality, etc. Based on these characteristics, the process may determine from various choices of recommendations. The examples shown include, but the choices are not limited to, current-location recommendations, along-route recommendations, and historic expectation recommendations.

Current-location recommendations are delivered based on an expectation or observation that the user will park or is parked in a proximate locality. These may be appropriate, for example, if a user is near a destination or previously-used stopping point, or if the update is highly critical or useful. On-route or along-route recommendations are recommendations of possible stopping points along a projected or known route. These can be informative, in case the user was planning on possibly making a stop (e.g., food/gas/coffee) and may incentivize the stop at a certain location or for a certain duration.

Historical observations may be useful if an update has been pending for a while, but the user has not yet parked in a spot reasonable for obtaining the update. These recommendations will indicate locations that the driver has frequented in the past which also have nearby high-speed transfer expectations. This can encourage the driver to visit one of those locations or otherwise indicate an intent to visit one of those locations, so the vehicle knows when it may expect completion of the update.

Figure 4:
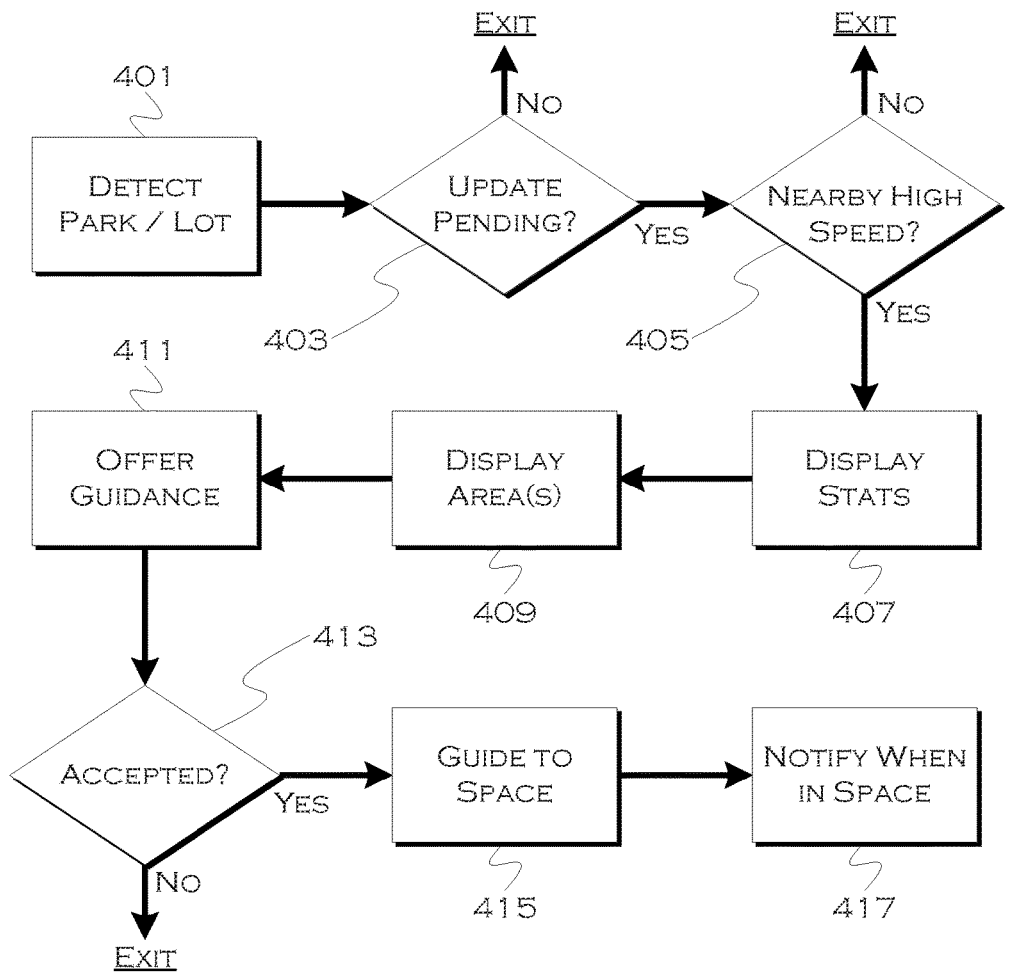
FIG. 4 shows an illustrative process for detecting parking and providing localized guidance.

If the process decides 303 to provide an at-location recommendation (an example of this is shown in FIG. 4), the process may search within a predefined proximity for one or more high-speed transfer locations. For example, these may be areas of high-speed coverage with known parking. If parking data is available, availability of parking can also be considered, as well as proximity not only to a user location, but to a user known or projected destination.

In this example, the process searches for both areas of known high-speed coverage 305 and/or a nearby high-speed parking lot 307 (or space(s)). If the first is identified, the user can arrange to park within the zone of high-speed coverage, which can involve self-guided or vehicle-guided directions to a parking space within the zone. If the second is identified, the user can receive guidance to the lot wherein the high-speed coverage is available (presumably after determining that parking in the lot is acceptable).

From one or both data sets (localities of high-speed coverage and parking for the same), the process can identify 309 specific high-speed areas and display 311 those areas on a map for the user to consider. This can include display on a mobile device, display on a vehicle device and/or simply asking a user if they would like directions to the nearest or a specific area of coverage.

The user can request guidance, and the process can provide 313 localized guidance to areas of coverage, which can include guidance to parking lots, guidance to zones of coverage, guidance to specifically identified available parking (i.e., using availability data), etc. When the driver is being guided to a zone of coverage, or a space, the process can also indicate 315 to the driver when the vehicle detects the desired wireless communication option (e.g., when the vehicle obtains 5G coverage).

If the process is going to provide a recommendation along a route 317, such as for reasons discussed above, the process can examine a current route or predicted route and determine if there are areas (such as parking lots) where a user can stop and obtain high-speed coverage along the route 319. This can include any lots, or may be a more refined search, such as lots within a certain proximity to other services the user typically uses (based on observation), such as gas (if fuel is low), food (based on time of day), or other shopping or stopping preferences.

If any lots or parking areas meet the parameters 321 for recommendation, the process can provide 323 one or more recommendations of places where a user might consider stopping in order to complete a download while the user engages in another activity. The process may also display 325, on a vehicle HMI for example, the lots along a route. This display may occur even if there are no "recommended" lots, as it may be useful for the user to know of the existence of the lots, even if those parking areas are not proximate to any place the user would historically have another reason at which to stop.

If the process is providing a recommendation based on historical user travel data 327, for reasons such as those discussed above, and the like, the process may search known user stopping and/or travel areas (based on saved, historic data) and determine 329 areas of high-speed transfer-availability in those historic areas.

The process can then notify the user of those historic areas, in case the driver plans to travel to one of those areas soon (and thus may not be concerned with immediately parking in a high-speed transfer area). If and when the vehicle is proximate 333 to one of the historic areas, or if one of the historic areas is along a planned route 335, the process can proceed to the appropriate previously-discussed portions 305, 319 to complete the identification, recommendation and localized guidance processes, as appropriate.

FIG. 4 shows an illustrative process for detecting parking and providing localized guidance. In this example, the process uses the fact that a user has entered a known parking area 401, coupled with a determination 403 that a high-speed transfer is pending or desired, to direct a user to a parking location that has, or is predicted to have, high speed coverage. Desirability of a high-speed transfer can include, for example, a user indication or a request indicating a desired speed, a volume of data over a high-speed transfer preference threshold, or a criticality indicator over a criticality threshold for high-speed transfer.

Once the process identifies that the user is within a known parking area and has a high-speed transfer pending, in this example, the process determines 405 if there is a high speed location nearby. This can include high speed locations within a given lot in which the user is located, or locations within a reasonable, predefined distance of the lot, such as those that would still provide access to one or more business or buildings associated with the lot.

In this example, the process may display 407, if desired, the statistics on transfer, such as the volume of data and the time for transfer at different speeds. This can help the user determine if parking at a high-speed location is needed. For example, if the process indicates that it will take 20 minutes at 4G speed and 5 minutes at 5G speed to finish an update, but the user will be parked for over 30 minutes, the user may elect to park in any spot, knowing that the transfer will be completed in either event. Other data pertinent to the decision-making process can also be displayed.

The process may also display 409 the various coverage known or projected for each parking space or region of the parking area. This can include both a text and visual component, the text possibly being useful for deck-parking, where it may indicate projected transfer speeds, if any, for various deck-levels and level-locations.

The process may further offer 411 guidance to a local area of high-speed coverage, in case the user does not want to process the displayed information and simply wants to be guided to a high-speed space. If the user accepts 413 the guidance, the process can provide 415 localized guidance to a space, and notify 417 the user when the vehicle is in the space. Alternatively, the user can forego the guidance and simply rely on the displayed coverage areas to determine where to park. Even if the user is not guided to the space, the user may be audibly or visually notified when the vehicle is within a zone of high-speed coverage.

The illustrative embodiments allow for improved parking planning that accommodates an expected or known need, or preference, for parking in an area of high-speed wireless coverage. This, in turn, can improve transfer times and completion rates of large file transfers to a vehicle and vehicle software/firmware updates, which will improve the user experience and ensure that a better volume of updates are being delivered to users on a regular basis.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
    determine that a data transfer is requested for a vehicle and is designated for execution over a network having at least a predefined speed;
    identify parking that is within a first predefined distance from a destination location and that overlaps with identified areas of network coverage meeting a or exceeding the predefined speed; and
    display visual indicators of the identified parking, when the vehicle is within a second predefined distance from the identified parking.

2. The system of claim 1, wherein the determination that the data transfer is designated for execution over a network having at least a predefined speed is based on a user indication.

3. The system of claim 1, wherein the determination that the data transfer is designated for execution over a network having at least a predefined speed is based on information included in a pending request.

4. The system of claim 3, wherein the information included in the pending request includes a requested transfer-speed.

5. The system of claim 3, wherein the information included in the pending request includes a requested data volume meeting a predesignated threshold for high-speed transfer.

6. The system of claim 3, wherein the information included in the pending request includes a criticality indicator meeting a predesignated threshold for high-speed transfer.

7. The system of claim 1, wherein identifying parking further includes identifying parking which is also determined to be unoccupied parking.

8. The system of claim 1, wherein the displaying visual indicators includes displaying parking availability.

* * * * *